(12) United States Patent
Morrison (10) Patent No.: US 7,061,519 B2
(45) Date of Patent: Jun. 13, 2006

(54) SCALING AN IMAGE

(75) Inventor: Robert D. Morrison, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 10/638,623

(22) Filed: Aug. 9, 2003

(65) Prior Publication Data

US 2005/0030368 A1    Feb. 10, 2005

(51) Int. Cl.
    *B41U 2/47*    (2006.01)
(52) U.S. Cl. ...................................................... 347/252
(58) Field of Classification Search ................ 347/144, 347/240, 251–254, 131, 196; 382/298–300, 382/257, 202–203, 220, 258, 295; 358/1.7; 345/475, 619, 660, 673, 472; 327/271
    See application file for complete search history.

(56) References Cited

U.S. PATENT DOCUMENTS

| | | | |
|---|---|---|---|
| 5,438,353 A | 8/1995 | Morrison | 347/250 |
| 5,760,816 A | 6/1998 | Morrison | 347/249 |
| 6,020,773 A * | 2/2000 | Kan et al. | 327/271 |
| 6,091,426 A * | 7/2000 | Hauck et al. | 345/619 |
| 6,236,427 B1 | 5/2001 | Roylance et al. | 347/249 |
| 6,340,986 B1 | 1/2002 | Morrison et al. | 347/249 |
| 6,366,307 B1 | 4/2002 | Morrison | 347/249 |
| 6,373,515 B1 | 4/2002 | Morrison | 347/249 |
| 2002/0135789 A1* | 9/2002 | Ono | 358/1.7 |
| 2004/0076335 A1* | 4/2004 | Kim | 382/257 |

FOREIGN PATENT DOCUMENTS

EP    947912 A2 * 10/1999

OTHER PUBLICATIONS

U.S. Appl. No. 09/985,753, filed Nov. 6, 2001, Kawamura.
U.S. Appl. No. 10/659,342, filed Sep. 11, 2003, Kawamura.

* cited by examiner

*Primary Examiner*—Hai Pham
(74) *Attorney, Agent, or Firm*—Gregg W. Wisdom (57) ABSTRACT

A method for scaling an image includes determining a plurality of lineweight values for a plurality of virtual scan lines. In addition, the method includes determining a normalization value using the plurality of lineweight values. The method further includes determining a pulse code value for a pixel in an actual scan line using the plurality of lineweight values, the normalization value, and pulse code values for pixels in the plurality of virtual scan lines.

36 Claims, 10 Drawing Sheets

SCALING AN IMAGE

In imaging devices, such as electrophotographic imaging devices or ink-jet imaging devices, users occasionally wish to scale images to fit predetermined regions of media. Scaling of images involves compression or expansion of the images in the horizontal and vertical dimensions of the media. The vertical dimension of the media corresponds to the dimension of the media substantially parallel to the direction the media moves through a media path in the electrophotographic imaging device. The horizontal dimension of the media corresponds to the dimension of the media substantially perpendicular to the direction the media moves through the media path in the imaging device. In electrophotographic imaging devices, scaling of images can be accomplished by changing the pixel size through control of the pulsing of a laser beam. In inkjet imaging devices, scaling of images in the horizontal direction can be accomplished through control of the ejection of ink. However, to scale an image in both the vertical and horizontal dimensions of the media, it is helpful to have the capability in the imaging device that permits the scaling of images in the vertical dimension of the media.

SUMMARY

A method for scaling an image includes determining a plurality of lineweight values for a plurality of virtual scan lines. In addition, the method includes determining a normalization value using the plurality of lineweight values. The method further includes determining a pulse code value for a pixel in an actual scan line using the plurality of lineweight values, the normalization value, and pulse code values for pixels in the plurality of virtual scan lines.

DESCRIPTION OF THE DRAWINGS

A more thorough understanding of an embodiment of the scaling system may be had from the consideration of the following detailed description taken in conjunction with the accompanying drawings in which:

Shown in FIG. 1 is a simplified block diagram of an embodiment of an electrophotographic imaging device including an embodiment of the scaling device.

Shown in FIG. 2 is a diagram that illustrates the compression process in the vertical direction of an image.

Shown in FIG. 3 is a diagram that illustrates the expansion process in the vertical direction of an image.

Shown in FIG. 4 is a graphical representation of the first way for combining scan lines.

Shown in FIG. 5 is a graphical representation of the second way for combining scan lines.

Shown in FIG. 6 is a graphical representation of the third way for combining scan lines.

Shown in FIG. 7 is a graphical representation of the fourth way for combining scan lines.

Shown in FIG. 8 is a simplified block diagram of an embodiment of a scaling device.

Shown in FIG. 9 is a simplified block diagram of an embodiment of a scaling device.

Shown in FIG. 10 is a high level flow diagram of a method for scaling an image.

DETAILED DESCRIPTION OF THE DRAWINGS

Although embodiments of the scaling system will be discussed in the context of a monochrome electrophotographic printer, it should be recognized that embodiments of the scaling system could be usefully applied in other types of imaging devices. For example, embodiments of the scaling system could be used in color electrophotographic printers, color and monochrome electrophotographic digital copiers, color and monochrome fax machines and the like. Furthermore, although embodiments of the scaling system will be discussed in the context of scaling of an image in the vertical direction, it should be recognized that embodiments of the scaling system could be used with or independently of systems that scale an image in the horizontal direction. In addition, embodiments of the scaling system could be usefully applied in other types of imaging devices that form or display images from pixels in two dimensions, such as color or monochrome inkjet printers or video displays.

Figure 1:
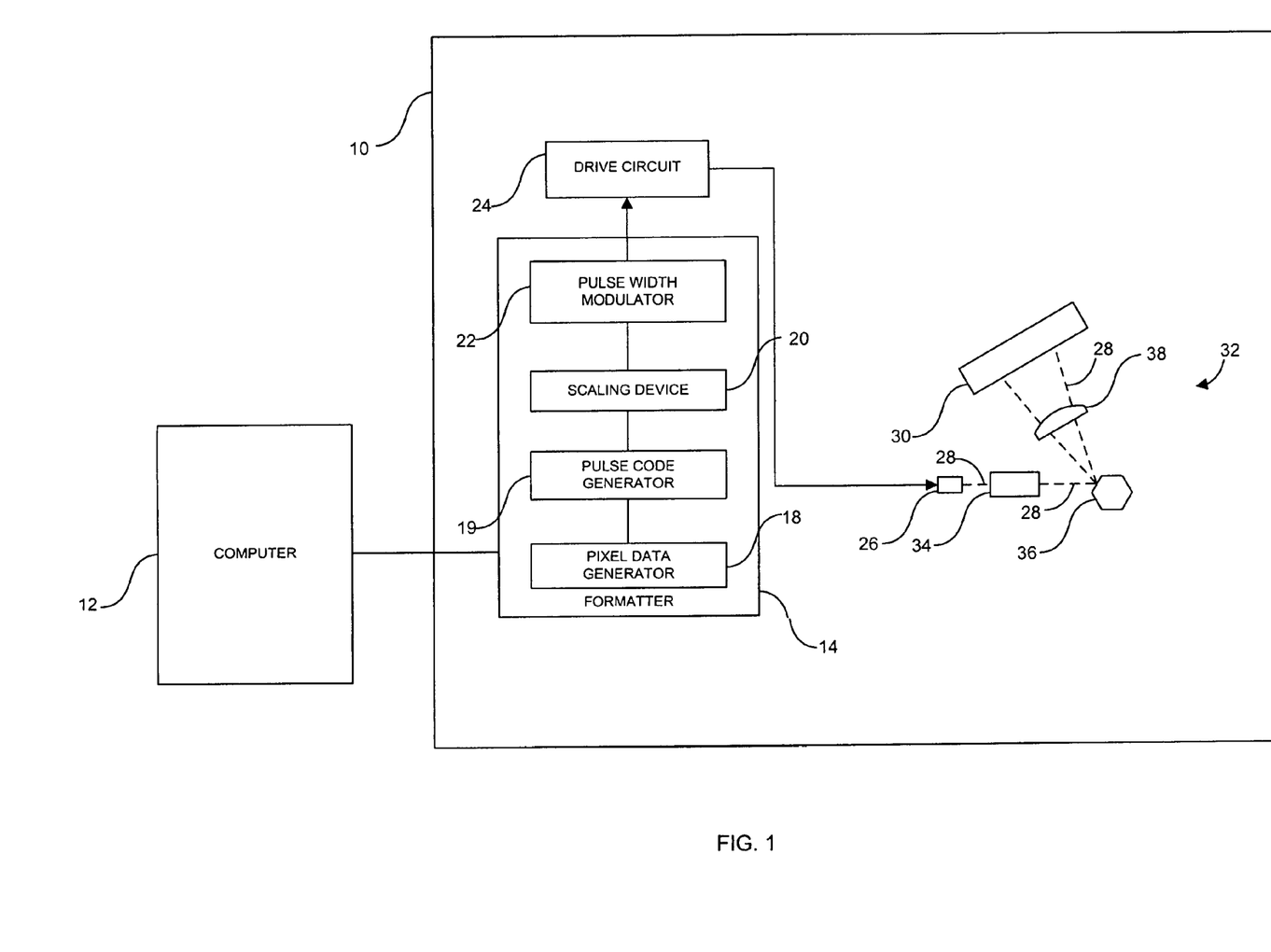

Shown in FIG. 1 is a simplified block diagram of an exemplary electrophotographic imaging device, electrophotographic printer 10 including an embodiment of the scaling system. Host computer 12 provides image data to electrophotographic printer 10. Typically, the image data provided by computer 12 is in the form of a high level page description language such as HEWLETT-PACKARD COMPANY'S PCL-5. However, lower level page description languages such as HEWLETT PACKARD COMPANY'S PCL-3 could be used. Formatter 14 included within electrophotographic printer 10 includes the electronic hardware and firmware to translate the image data into a format used to form an image on media 16.

Pixel data generator 18 generates data corresponding to each of the pixels forming the image using the image data. For a monochrome printer the pixel data could include 8 bits per pixel. Pulse code generator 19 generates pulse code data for each pixel using the corresponding pixel data provide by pixel data generator 18. An embodiment of a scaling device, scaling device 20, receives the pulse code data and performs expansion or compression of the image in a direction media 16 moves through the media path using the pulse code data. The transformed pulse code data from scaling device 20 is provided to pulse width modulator 22. Using the transformed pulse code data, pulse width modulator 22 generates a stream of binary data corresponding to the transformed pulse code data. The stream of binary data is supplied to drive circuit 24. Drive circuit 24 switches current through laser diode 26 in response to the stream of binary data so that laser beam 28 is selectively emitted from laser diode 26 corresponding to the switching of current. The stream of binary data is delivered in segments that correspond to the pixels forming a scan line. The segments of the stream of binary data supplied to driver circuit 24 are synchronized with a signal generated before scan lines begin. This signal, typically known as the beam detect signal, is generated when the laser beam 28 illuminates an optical sensor before laser beam 28 begins its sweep in direction 32 across a photoconductor, such as photoconductor drum 30.

Laser diode 26 is included within an embodiment of a photoconductor exposure system, photoconductor drum exposure system 32. In photoconductor drum exposure system 32, laser beam 28 is passed through collimating lens 34 after emission from laser diode 26. Scanning mirror 36 includes multiple reflective faces that direct laser beam 28 onto the surface of photoconductor drum 30. Laser beam 28 passes through flat focusing lens 38, located in the path of laser beam 28 between scanning mirror 36 and photoconductor drum 30. Flat focusing lens 38 is shaped so that the rate at which laser beam 28 is swept in direction 32 across photoconductor drum 30 is substantially constant. As the scanning mirror 36 rotates, laser beam 28 is swept across photoconductor drum 30. Laser beam 28 is pulsed according to the stream of binary data received by driver circuit 24 as it is swept across photoconductor drum 30 to form the latent electrostatic image scan line by scan line.

The photoconductor drum drive system (not shown in FIG. 1) included within electrophotographic printer 10 is configured to rotate photoconductor drum 30. Photoconductor drum 30 is rotated during the formation of the latent electrostatic image. The photoconductor drive system is configured to rotate photoconductor drum 30 at a substantially constant rotational rate during formation of the latent electrostatic image. In electrophotographic printer 10, the resolution in the vertical direction is related to the rate at which photoconductor drum 30 is rotated. Typically, the greatest vertical resolution is 600 lines per inch because of mechanical constraints in the photoconductor drive system.

The embodiment of the scaling system included within electrophotographic printer 10 includes the capability to expand or compress the image in the vertical direction. The scaling of the image in the vertical direction is accomplished while maintaining the number of lines per inch at which the photoconductor drive system rotates photoconductor drum 30 substantially constant. To accomplish the scaling in the vertical direction scan lines of pulse code data are combined or repeated as necessary to generate the image expansion or compression in the vertical direction. The compression or expansion of the image in the vertical direction can be done by non-integer factors.

As previously mentioned, pulse code generator 19 generates pulse codes for each of the pixels. The pulse codes are generated in the order of succession of the pixels across scan lines in the direction that laser beam 28 sweeps across the surface of photoconductor drum 30. In the compression process, these scan lines of pulse codes are combined with other scan lines of pulse codes generated by pulse code generator 19 to generate scan lines of pulse codes for pixels that will actually be developed onto the surface of photoconductor drum 30. The scan lines of pulse codes generated by pulse code generated by pulse code generator 19 will be referred to as virtual scan lines of pulse codes or virtual scan lines. The scan lines of pulse codes that result from combining the virtual scan lines will be referred to as actual scan lines of pulse codes or actual scan lines.

For the purpose of determining how the virtual scan lines are to be combined to form the actual scan lines, a running count of a number related to the number of virtual scan lines that have occurred is kept. This number is used in determining the weighting of virtual scan lines for combining the virtual scan lines to form the actual scan lines. For the compression process, this number is determined by successively adding the reciprocal of the number of virtual scan lines that are compressed into each actual scan line. The number successively added can be regarded as the number of actual scan lines that occur for each virtual scan line. The number corresponding to the running count will be referred to as the scan line counter value. The number successively added corresponds to the scale factor, which is less than one for a compression. An addition of this number to the scan line counter value is performed for each virtual scan line of pixels generated. Some of the higher order bits of the integer portion of the scan line counter value are not retained because they are not used for determining how virtual scan lines are combined or for the weighting used for combination of the virtual scan lines.

The fractional portion of the scan line counter value can be used in determining the weighting of the virtual scan lines when combining virtual scan lines to form actual scan lines for an embodiment of the scaling device 20. The weighting factor used for combining virtual scan lines is also dependent on the location of the virtual scan line in the succession of virtual scan lines. For example, in one embodiment of the scaling device 20, for virtual scan lines in the middle region of a group of scan lines used to form an actual scan line corresponding to the group, the weighting factor may be different than for either the first or last virtual scan line forming the group. For the virtual scan lines in the middle of a region, the number of virtual scan lines for each actual scan line may be used to determine the weighting. For the first or last virtual scan line forming the group, the fractional value of the scan line counter value is used in determining the weighting to form the actual scan line corresponding to the group. The integer portion of the scan line counter value that is retained is used in determining when an integer boundary is crossed. When the integer portion of the scan line counter value changes, it indicates that the corresponding virtual scan line will be used in forming two successive actual scan lines. It should be recognized that other embodiments of the scaling device 20 can use different methods to determine the weighting of the virtual scan lines combined to form the actual scan line.

A generalized expression for the determination of the weighting factors of the group of virtual scan lines used to form a group of actual scan lines follows. The number of virtual scan lines that are to be combined (which is determined using the integer portion of the scan line counter value corresponding to the last virtual scan line in the group to be combined to form the actual scan line and designated as "m" below) is determined as:

$$l = \text{ceiling}\{n.\text{lowfrac} + VA\} - n + 1; \qquad \text{Eq. 1}$$

where "n.lowfrac" equals the scan line counter value (having an integer portion equal to "n" and a fractional portion equal to ".lowfrac") of the first virtual scan line in the group of virtual scan lines to be combined; where "VA" equals the number of virtual scan lines for each actual scan line (the compression factor); and where "ceiling" is a function that returns the next greater integer value of the argument. The scan line counter value that corresponds to the last virtual scan line in the group combined equals m.highfrac, with the integer portion of this scan line counter value equal to "m". The last virtual scan line in the group combined is the first virtual scan line for which the corresponding scan line counter value has had its integer value change.

Virtual scan lines are combined by combining corresponding pulse code values for the corresponding pixels forming the virtual scan lines in the group of virtual scan lines to be combined. Combining the corresponding pulse code values from the corresponding values for the pixels forming the corresponding actual scan line. The values for the pixels in the actual scan line that results from combining the values for the pixels in the virtual scan lines is determined for one embodiment of scaling device 20 as:

$$\text{line\_actual}(k, \text{pixel}) = \sum_{\text{over } j=0 \text{ to } l-1} \{\text{lineweight}(j) \times \text{line\_virtual}(j, \text{pixel})\} \div \{\text{normalization}(k)\}; \qquad \text{Eq. 2}$$

$$\text{normalization}(k) = \sum_{\text{over } j=0 \text{ to } l-1} \text{lineweight}(j, k); \qquad \text{Eq. 3}$$

-continued $$\text{lineweight}(j, k) = (1 - \text{lowfrac}) \div VA; \text{ for } j = 0 \quad \text{Eq. 4}$$
$$= 1 \div AV; \text{ for } j = 1 \text{ to } j = l - 2$$
$$= \text{highfrac} \div VA; \text{ for } j = l - 1$$

In equation 2 above, the values used for line_virtual(n, pixel), over the range of values used for n, correspond to the group of virtual scan lines combined to form actual scan line k. For successive groups of virtual scan lines that are combined, the last virtual scan line in the previous group of virtual scan lines combined and the first virtual scan line of the next group of virtual scan lines to be combined are combined (in a weighted fashion) with the current group of virtual scan lines. Stated differently, a weighted portion of the first and last virtual scan lines in each group of virtual scan lines to be combined to form an actual scan line is used in computing, respectively, the previous actual scan line and the next actual scan line. The first virtual scan line in a group of virtual scan lines corresponds to the n.lowfrac value of the scan line counter and the last virtual scan line in a group of virtual scan lines corresponds to the m.highfrac value of the scan line counter.

The values used for line virtual(j,pixel) and line_actual (k,pixel) represent the fractional portion of the pixel that is to be covered with colorant. For an electrophotographic imaging device, this corresponds to the fraction of the area of the pixel that is developed with toner. For an inkjet imaging device this corresponds to the fraction of the area of the pixel onto which ink is deposited. For those embodiments of imaging devices that do not have the capability for placement of colorant onto fractional portions of the pixel (that is, the pixel either has no colorant placed onto it or sufficient colorant to cover the entire pixel), the values of line_virtual(j,pixel) will be either 0 or 1. For those embodiments of imaging devices that have the capability for placement of colorant onto fractional portions of the pixel, the values of line_virtual(j,pixel) can range from 0 to 1 continuously.

Figure 2:
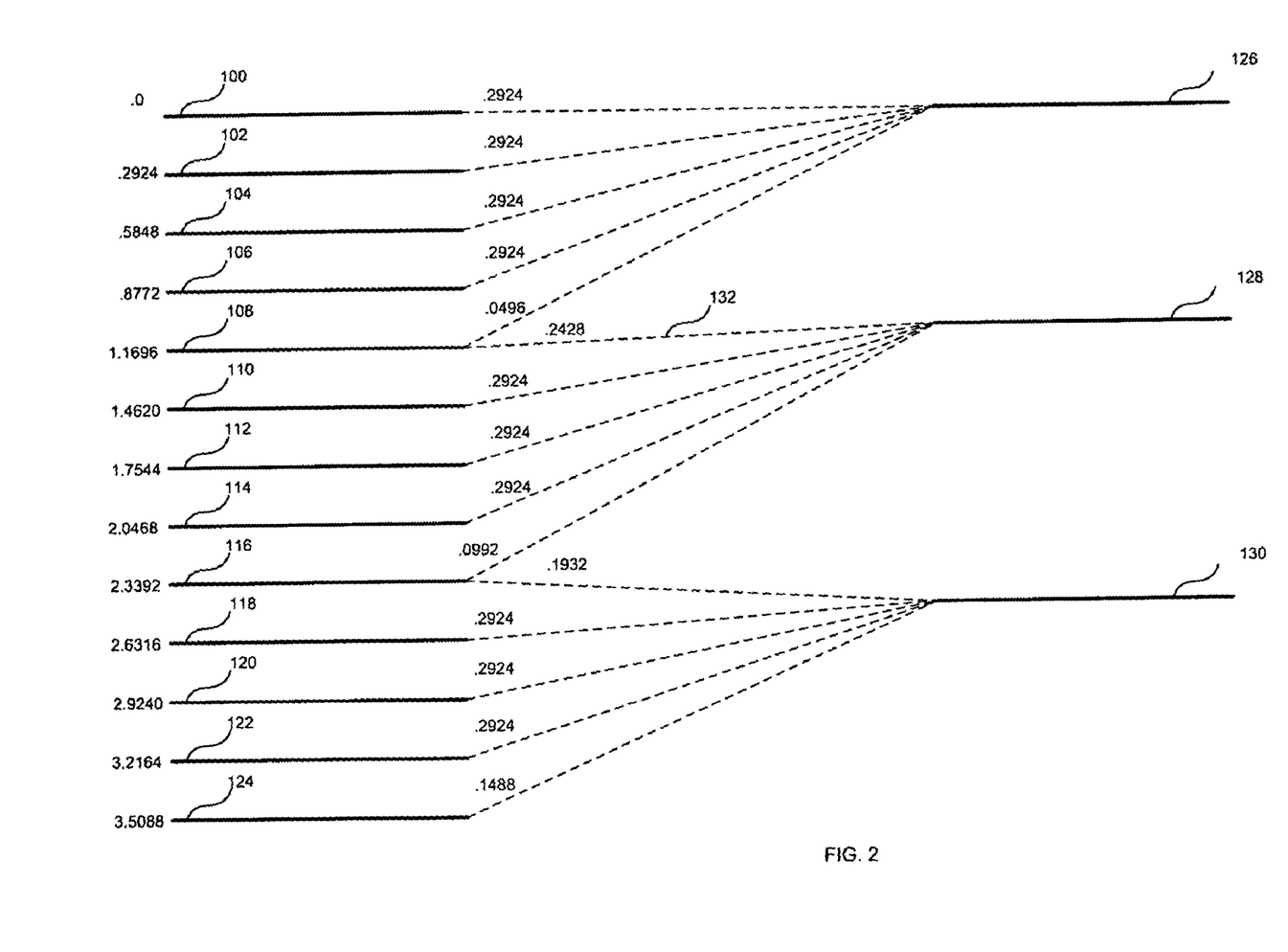

Shown in FIG. 2 is a diagram that illustrates the compression process in the vertical direction of an image. FIG. 2 corresponds to the case in which the compression in the vertical direction is performed by a factor of 3.42 (the value that would be assigned to VA in the previous equations). For each of the pixels in each of the virtual scan lines, there is a pulse code that represents how the regions on the surface of photoconductor drum 30 corresponding to the pixels with which the pulse codes are associated are to be exposed by laser beam 28. In the pulse code scheme implemented in electrophotographic printer 10, the pulse codes can define 4 pulse shapes within the pixel. Each pulse code includes 8 bits of which 2 bits are used to specify to which pulse shape will be formed on the pixel and 6 bits are used to specify the size of the region that will be exposed for the specified pulse shape. Although pulse code generator 19 includes the capability to generate a particular set of possible pulse codes (corresponding to pulse shapes), it should be recognized that embodiments of scaling device 20 could be adapted for operation with a variety of different pulse code generation schemes.

The 4 pulse shapes include a center justified pulse, a right justified pulse, a left justified pulse and a split justified pulse. A center justified pixel is formed from a pulse having edges centered with respect to the dimension of the pixel in the direction laser beam 28 moves across photoconductor drum 30 during a sweep. A left justified pulse includes a pulse that has an edge located on the left side of the pixel. For the electrophotographic printer 10, laser beam 28 sweeps from left to right so that the first edge of the pixel that laser beam 28 can expose is the left edge of the pixel and the last edge of the pixel that laser beam 28 can expose is the right edge of the pixel. However, it should be recognized that other embodiments of electrophotographic imaging devices could be configured to sweep a laser beam in the opposite horizontal direction. A right justified pulse includes a pulse that has an edge located on the right side of the pixel. A split justified pulse includes pulses with edges located on the left and right sides of the pixel.

In FIG. 2, virtual scan lines 100–124 represent the pulse codes for 14 virtual scan lines of pulse codes corresponding to a region of a unit of media starting at the leading vertical edge of the unit of media 16 onto which an image can be formed. Applying equation 1 above to determine the number of virtual scan lines to combine (beginning with virtual scan line 100), indicates that 5 virtual scan lines are to be combined to form each of actual scan line 126–130. As previously mentioned (and as can be seen from virtual scan line 108 and 116), the first and last virtual scan lines in each group of virtual scan lines to be combined (with the exception of the very first virtual scan line for the page and the very last virtual scan line for the page) are used in forming multiple actual scan lines. On the left side of each of virtual scan lines 100–124 are the corresponding values of the scan line counter. Lines 126–130 represent the actual scan lines resulting from combining virtual scan lines 100–124. Dashed lines with arrows, of which dashed line 132 is representative, show which of virtual scan lines 100–124 are used in forming actual scan lines 126–130. Associated with each of the dashed lines is a corresponding weighting factor. The weighting factor is used to weight the pulse codes of the respective line with which it is associated before that line is combined with the others to form the associated actual scan line.

Consider the generation of actual scan line 128. Actual scan line 128 is formed by combining lines 108–116 in a weighted fashion. Because the vertical compression factor is 3.42, portions of 5 virtual scan lines are used to form one actual scan line. As can be seen from FIG. 2, virtual scan lines 110–114 are assigned a weighting factor of 0.2924, virtual scan line 108 is assigned a weighting factor of 0.2428, and virtual scan line 116 is assigned a weighting factor of 0.0992. Because multiple virtual scan lines are combined to form actual scan lines, the hardware for implementing some embodiments of the scaling system includes memory to store the multiple virtual scan lines used to form the actual scan lines. However, other embodiments of the scaling system could be implemented to function with less memory than that used to store multiple virtual scan lines. A description of hardware that could combine virtual scan lines 108–116 to form actual scan line 128 will be provided later in this specification.

It should be recognized that although one particular method for weighting virtual scan lines for combination has been discussed, there are other possible ways in which the virtual scan lines maybe weighted for combination. For example, instead of a linear type weighting for distributing the information of virtual scan lines associated with integer boundary crossings of the scan line counter value, a gaussian weighting may be used. With a gaussian weighting, information from virtual scan lines, in addition to those associated with integer boundary crossings of the scan line, are combined (according to a weighting that approximates a gaussian function) to form the actual scan lines. Although more computationally complex than the previously discussed linear type weighting (because more virtual scan lines are weighted and combined), a gaussian weighting may improve the perceived quality of the compressed image.

Where scaling is done to expand the image in the vertical direction, virtual scan lines may be repeated without combination and combined to accomplish the expansion. With an expansion in the vertical direction, the number of actual scan lines formed from each virtual scan lines is greater than one. For the expansion process, the scan line counter is incremented, for each virtual scan line processed, by a number related to the number of virtual scan lines used to form each scan line. This number is the reciprocal of the expansion factor and can be regarded as the fraction of a virtual scan line used to form each actual scan line. In addition to the expansion factor, another parameter is involved in an embodiment of the expansion process. This parameter will be referred to as the diffusion factor. The diffusion factor affects the degree to which the information in successive virtual scan lines is combined for the formation of the corresponding groups of actual scan lines. The value of the diffusion factor is greater than or equal to one. The larger the diffusion factor, the greater the degree to which the information included in the successive virtual scan lines is combined. It should be recognized that the diffusion factor is a parameter associated with a particular embodiment of the expansion process. Other ways in which virtual scan lines are expanded and combined to form the actual scan lines may not use the diffusion factor.

A generalized expression for determining the weighting of the virtual scan lines used to form the actual scan lines for expansion follows. The number of actual scan lines to generate from a virtual scan line is determined as:

$$l = \text{ceiling}\{df \times ds \times AV + \text{lowfrac}\};\quad\text{Eq. 5}$$

where "l" equals the number of actual scan lines to generate from a virtual scan line, "df" equals the diffusion factor, AV equals the expansion factor, ds represents a distribution symmetry factor. Where a simple diffusion distribution is used, ds is set equal to 1. Where a symmetric diffusion distribution is used, ds is set equal to 2. The distribution symmetry factor is used as to mathematically represent the selection between simple and symmetric distributions. As previously mentioned, the expansion factor corresponds to the number of actual scan lines formed for each virtual scan line. The values for the pixels in the actual scan line that is determined from the values for the pixels in the virtual scan lines is determined using the following relationships:

$$\text{actual\_line}(k, \text{pixel}) = \sum_{s}\{\sum_{i=0\text{ to }l-1}([\text{lineweight}(i+(AV\times(df\div2))-(s\times AV))\times\text{virtual\_line}(s, \text{pixel})]\div[\text{normalization}(k)])\};\quad\text{Eq. 6}$$

$$\text{normalization}(k) = \sum_{s}\{\sum_{i=0\text{ to }l-1}([\text{lineweight}(i+AV\times(df\div2)-(s\times AV))]\};\quad\text{Eq. 7}$$

Figure 3:
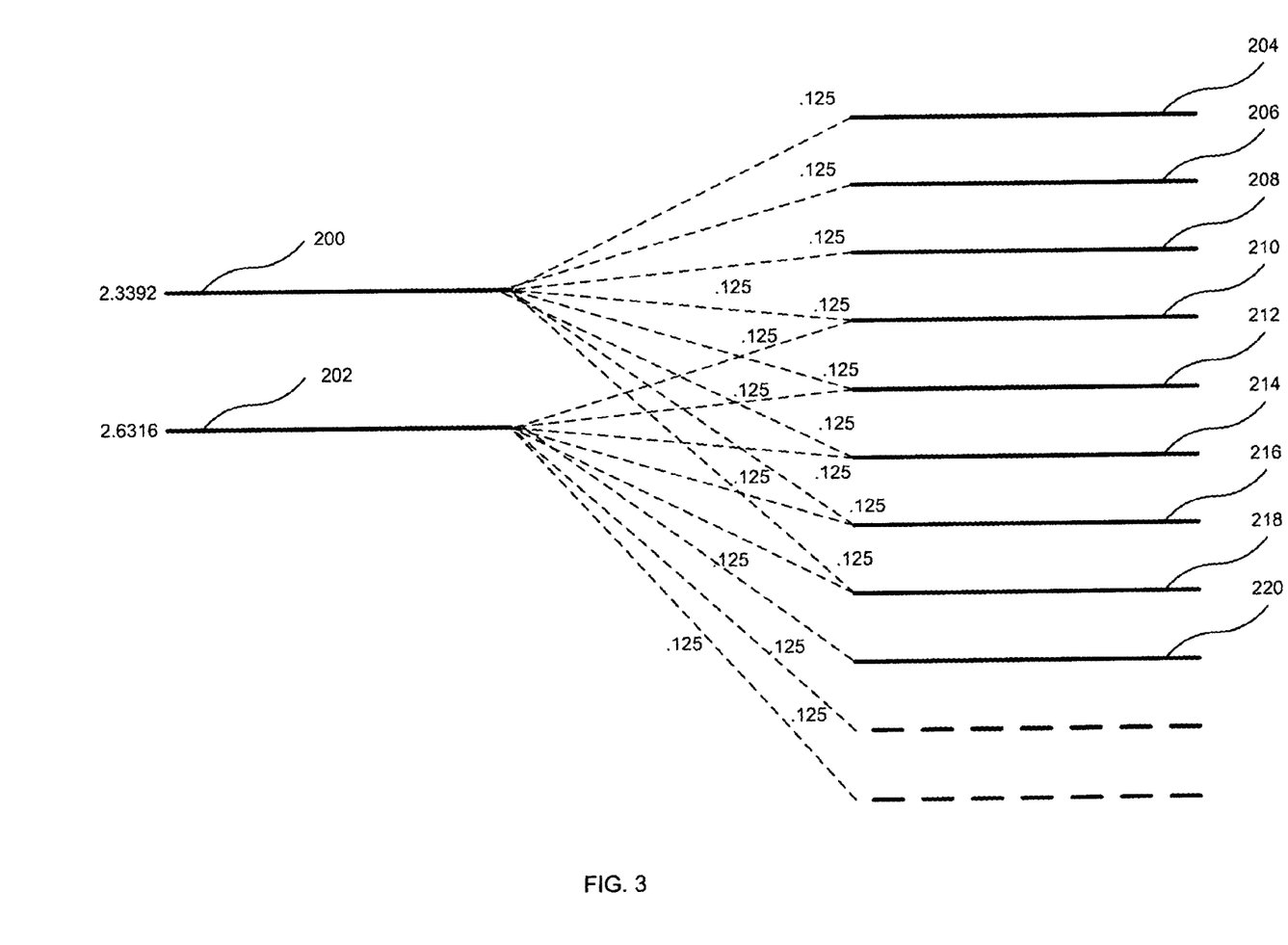

The lineweight function may make use of an arbitrary distribution function. For example, the distribution function could include a step function, a delta function or a gaussian function. In addition, the distribution function could include asymmetric functions as well as symmetric functions. For applying a lineweight value to a virtual scan line, the distribution function is sampled at locations specified by the argument (i.e., the value of "t" in lineweight[t]) of the lineweight function in equation 6. The range of the argument of the lineweight function can be from t=0 to t=2×AV×df. The distribution function can be selected so that the sum of the samples of its values over the sampled range (such as from 0 to l−1) equals one. The number of virtual scan lines that can be used to form the actual scan lines is typically two. With two virtual scan lines used to form the actual scan lines, the value of s in the equations above will range from s=0 to s=1. Shown in FIG. 3 is a representative distribution function that could be used in equations 6 and 7. The representative distribution function in FIG. 3 corresponds to a step function (for which there would not be variable weighting of the virtual scan lines). However, an arbitrary distribution function could be used in determining lineweight values to achieve the desired effect in the expansion. The distribution function is sampled at values corresponding to the argument in the lineweight function of equations 6 and 7.

Shown in FIG. 3 is a diagram that illustrates the expansion process in the vertical direction of an image where the value of the diffusion factor is equal to two. FIG. 3 corresponds to the case in which the expansion factor is 3.42. For the expansion of an image in the vertical direction, virtual scan lines will be repeated and combined with other virtual scan lines to form the actual scan lines. Consider the generation of nine actual scan lines 204–220 from virtual scan lines 200–202. Nine actual scan lines are shown as generated because it is a moving distribution. Virtual scan line 200 corresponds to a scan line counter value of 2.3392 and virtual scan line 202 corresponds to a scan line counter value of 2.6316. Applying equation 5 with the value of ds equal to 1, the value determined for l equals 8. Consider the case in which the distribution function used is a discretely valued step function that has a magnitude of 0.125. The number of steps over the range of values for which the step function is at a high value is 8 so that the sum of the magnitude of the distribution function at its discrete values equals 1. With the magnitude of the selected distribution function (selected so that the sum of the steps equals 1) the value of the normalization factor, which is the sum of the discrete values of the step function equals 1. It should be recognized that distribution functions could be selected with magnitudes such that the sum of the steps is not equal to one. For these types of distribution functions the normalization factor will not equal 1. FIG. 3 shows the weighting factors applied to virtual scan lines 200 and 202 and to form actual scan lines 204–220. In this particular example, the weighting factors are selected so that they will sum to 1 which gives a weighting value of 0.125. To generate the remaining actual scan lines from the other virtual scan lines of data, this expansion process is repeated for the remaining virtual scan lines. This process could be performed so that the successive groups of actual scan lines generated are generated using common virtual scan lines. For example, in FIG. 4, virtual scan line 200 could also be used, along with the previous virtual scan line, to generate the previous group of actual scan lines and virtual scan line 202 could be used to generate the next group of actual scan lines. Alternatively, the successive groups of actual scan lines could be generated from virtual scan lines so that no common virtual scan lines are used to generate the successive groups of actual scan lines.

Figure 4:
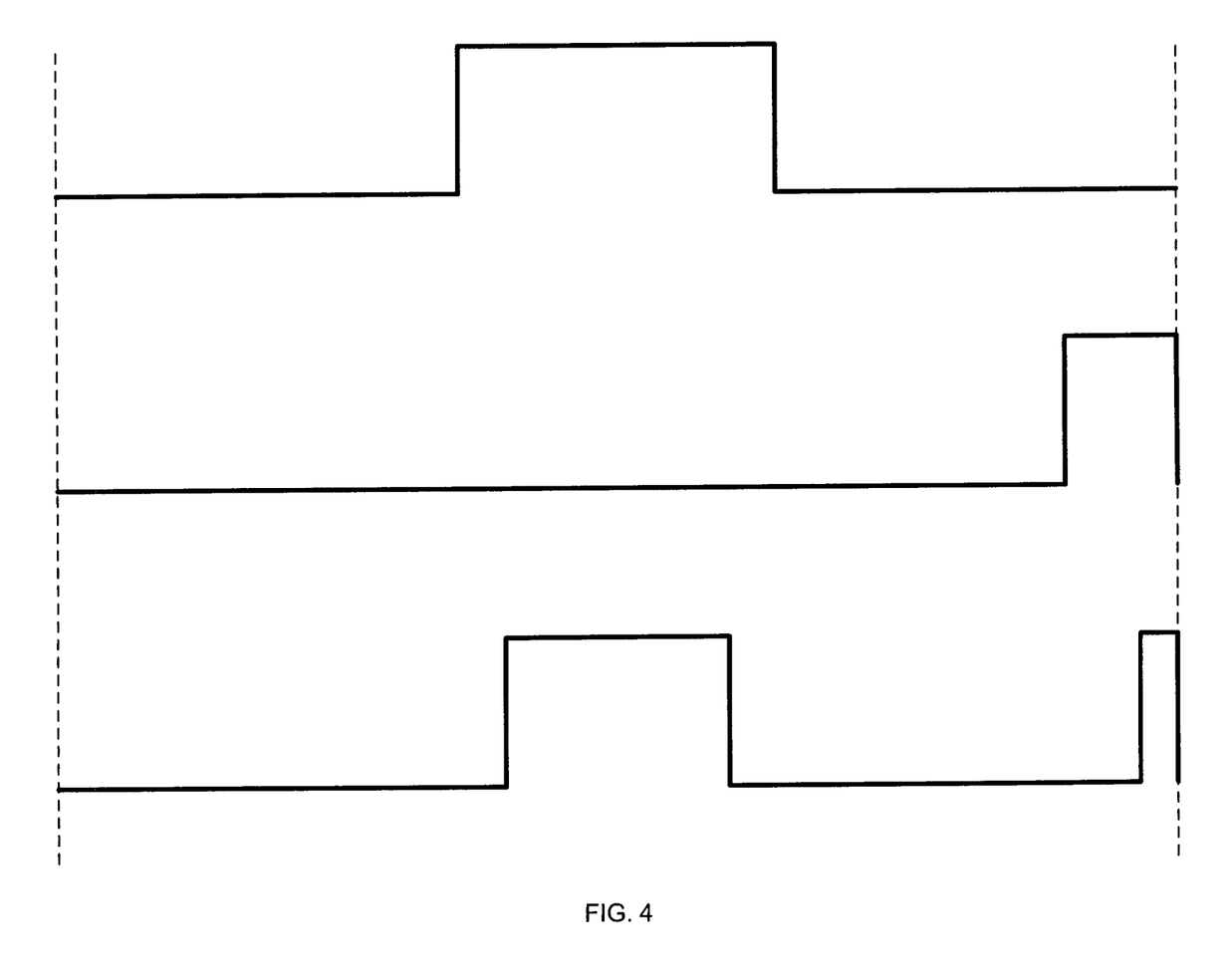

Scan lines of pulse codes may be combined in a variety of ways to form an actual scan line. A first way of combining scan lines of pulse codes includes scaling the pulse shapes (defined by each of the pulse codes), for each pixel of the scan lines of pulse codes to be combined, by the weighting factor. Then the two scaled scan lines of pulse codes would be combined in a spatial OR operation, pixel by pixel. For example, consider the pulse codes for corresponding pixels on two scan lines of pulse codes that are to be combined in a weighted fashion. Assume that one of the pulse codes corresponds to a center justified pulse occupying 30% of the pixel. Assume that the other of the pulse codes corresponds to a right justified pulse occupying 10% of the pixel. The weighting factors of the scan lines of pulse codes are 0.65 and 0.35 respectively. Therefore, the weighted center justified pulse would occupy 19.5% of the pixel and the weighted right justified pulse would occupy 3.5% of the pixel. A spatial OR operation applied to these two corresponding pixels would yield a single pixel having a center justified pulse occupying 19.5% of the pixel and a right justified pulse occupying 3.5% of the pixel. Shown in FIG. 4 is a graphical representation of the first way for combining scan lines.

For this first way of combining pulses, the scaling system would include the capability to generate the transformed pulse code data used by the pulse width modulator to create the pulses having the reduced width. In addition, the pulse width modulator would include the capability to use the transformed pulse codes for each of the pixels to generate the signals to provide to driver circuit 24 so that the composite pulse shape with reduced width could be generated. This method of combining pulse codes may perceptibly degrade print quality resulting from the loss of alignment of edges between pixels of successive actual scan lines.

Figure 5:
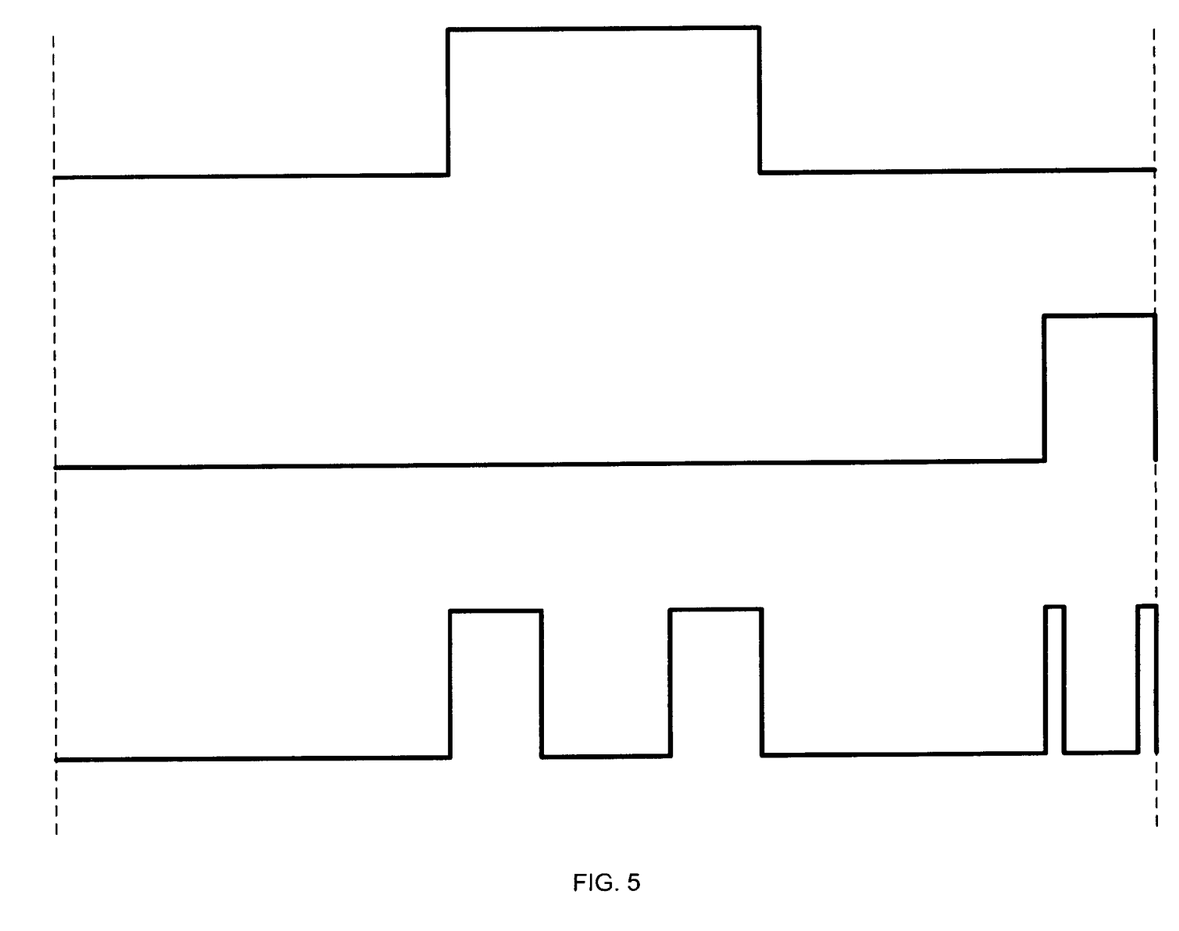

A second way of combining the pulse codes from two scan lines of pulse codes includes fixing the edges of the pulse shapes formed within the pixels and then removing portions of the pulse between the edges of the pulse according to the weighting factor. Then, a spatial OR operation is performed between the two scan lines of pulse codes that have been scaled. As in the example of the first way, consider the pulse codes for corresponding pixels on two scan lines of pulse codes that are to be combined in a weighted fashion. Assume that one of the pulse codes corresponds to a center justified pulse occupying 30% of the pixel. Assume that the other of the pulse codes corresponds to a right justified pulse occupying 10% of the pixel. The weighting factors of the scan lines of pulse codes are 0.65 and 0.35 respectively. Therefore, the weighted center justified pulse would occupy 19.5% of the pixel and the weighted right justified pulse would occupy 3.5% of the pixel. A spatial OR operation applied to these two corresponding pixels would yield a single pixel having a center justified pulse occupying 19.5% of the pixel and a right justified pulse occupying 3.5% of the pixel. However, the edges forming the center justified pulse would be located such that they spanned 30% of the pixel with a section corresponding to 10.5% of the pixel removed from the middle of the center justified pulse. In addition, the edges forming the right justified pulse would be located such that they spanned 10% of pixel with a section corresponding to 6.5% of the pixel removed from the middle of the right justified pulse.

Shown in FIG. 5 is a graphical representation of the second way for combining scan lines. For the second way of combining pulses, the scaling system would include the capability to generate the transformed pulse code data used by the pulse width modulator to create the pulses having the sections removed from the pulses. In addition, the pulse width modulator would include the capability to use the transformed pulse codes for each of the pixels to generate the signals to provide to driver circuit 24 so that the pulse shapes with the removed sections could be generated. The second way has the advantage over the first way of fixing the edges of the pulse shapes so that on successive actual scan lines, the effects of edge smoothing techniques are not eliminated. However, removing a section of the pulse in the interior may create visually perceptible artifacts.

Figure 6:
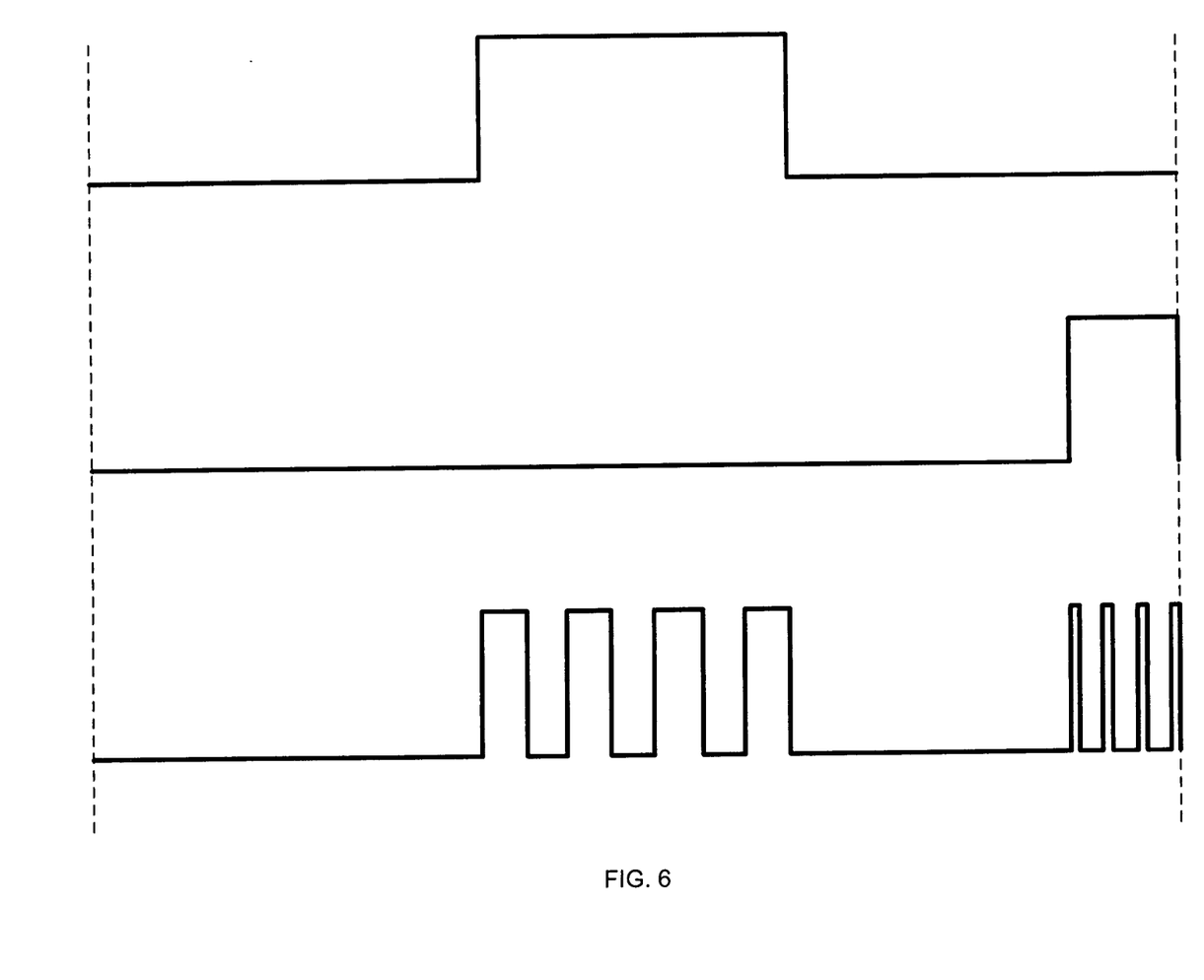

A third way of combining the pulse codes from two scan lines of pulse codes includes fixing the edges of the pulse shapes formed within the pixels and then removing portions of the pulse between the edges of the pulse according to the weighting factor. Instead of removing a single section from the pulse between the edges, multiple sections of the pulse are removed between the edges. In the third way the multiple sections of the pulse are of uniform size and uniformly distributed over the width of the pulse, although the size and number of the sections removed may vary between pulses. In the third way, the determination of the weighted width of the pulses is done as in the second way. Shown in FIG. 6 is a graphical representation of the third way for combining scan lines.

For the third way of combining pulses, the scaling system would include the capability to generate the transformed pulse code data used by the pulse width modulator to create the pulses having the multiple sections removed. Additionally, the pulse width modulator includes the capability to use the transformed pulse codes for each of the pixels to generate the signals to provide to driver circuit 24 so that the pulse shapes with the removed sections could be generated.

Figure 7:
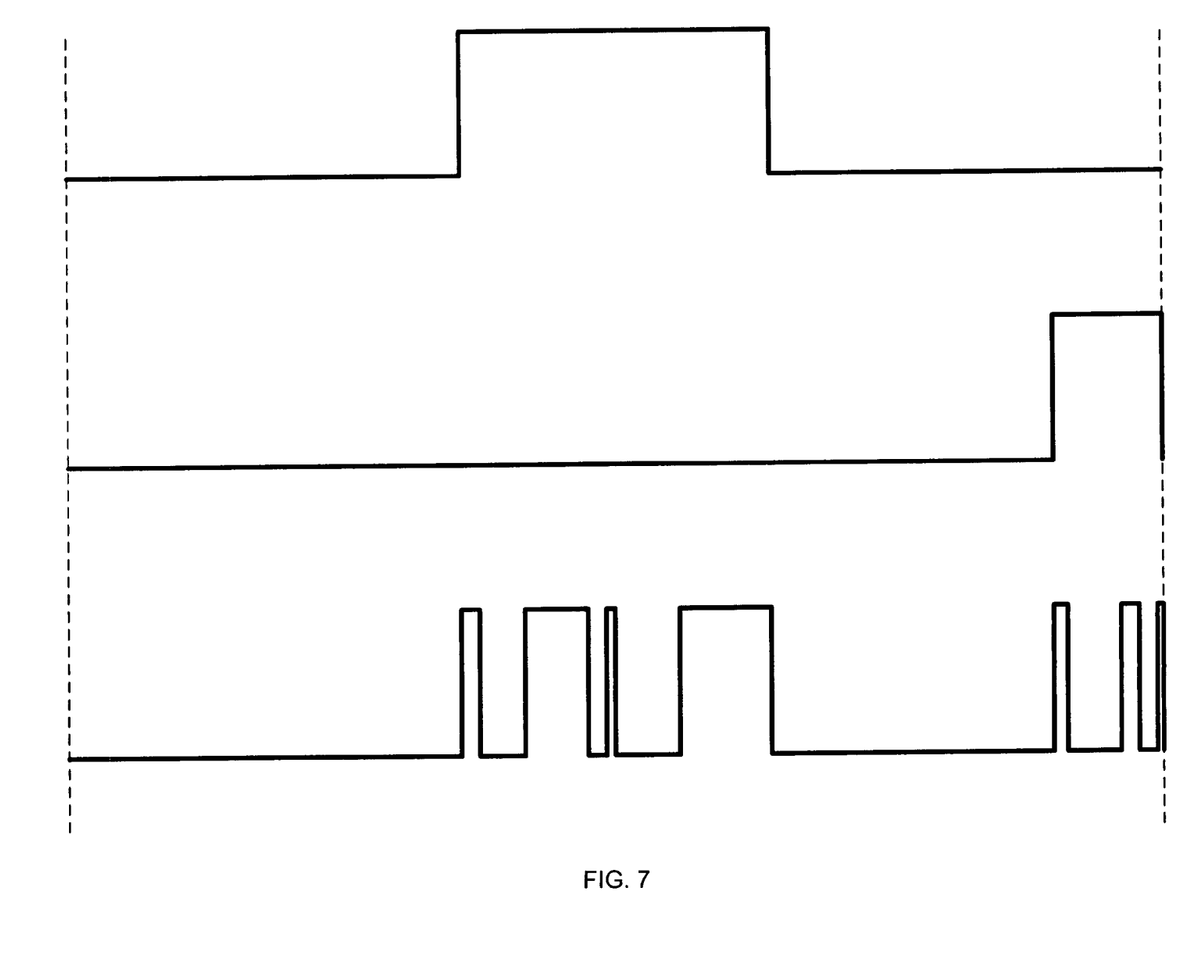

A fourth way of combining the pulse codes from two scan lines of pulse codes includes fixing the edges of the pulse shapes formed within the pixels and then removing portions of the pulse between the edges of the pulse according to the weighting factor. However, instead of removing sections of the pulses uniformly between the edges, the removal of sections of the pulses for the pixels forming an actual scan line is done so that over the actual scan line the location and sizes of the sections removed within the pulses is done randomly. By randomizing the location and size of the sections removed within the pulses in the pixels, the likelihood of visual artifacts occurring is reduced. Shown in FIG. 7 is a graphical representation of the fourth way for combining scan lines.

Figure 8:
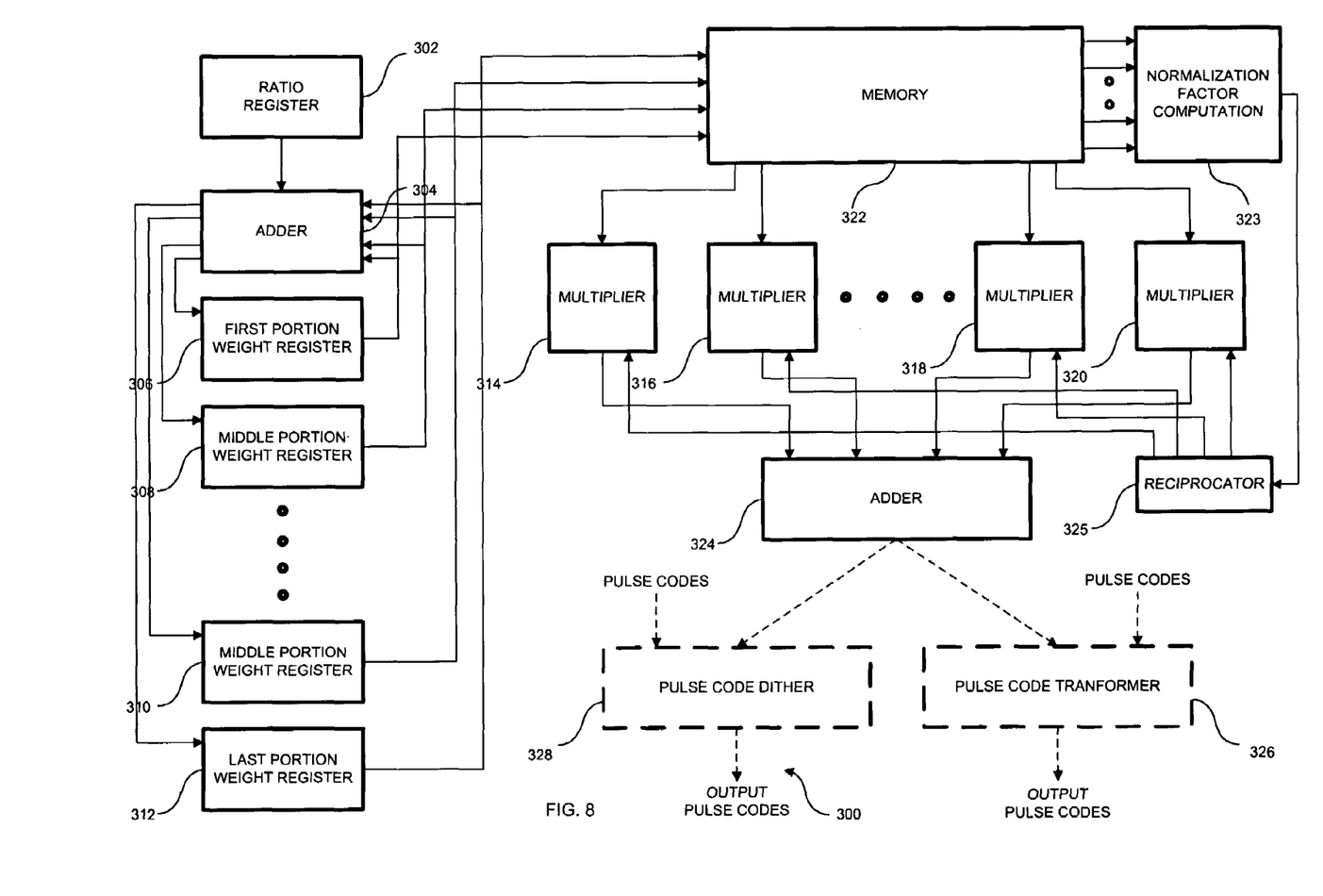

Shown in FIG. 8 is a simplified block diagram of an embodiment of scaling device 20, scaling device 300, corresponding to a linear weighting implementation. Ratio register 302 stores a value related to the compression or expansion factor for the scaling operation that will be performed. The ratio is determined as the number of actual scan lines that result for each virtual scan line of data used (in the case of compression) or the number virtual scan lines of data used for each actual scan line (in the case of expansion). For example, if virtual scan lines were to be compressed into actual scan lines with a compression factor of 3.42, the value stored in ratio register 302 would be 1/3.42, which approximately equals 0.2924. The desired level of precision achieved would be determined by the number of bits used for the fractional portion of the factor.

Adder 304 performs an addition of the value stored in ratio register 302 and each of the values stored in the registers 306–312. The result of the addition performed in adder 304 is stored in the corresponding one of registers 306–312 from which the values used in the addition originated. The number of registers used is related to the number of virtual scan lines that are combined (in a compression) or the number of actual scan lines generated from virtual scan lines (in an expansion). The values stored in the registers are used in the computation of the lineweights associated with the virtual scan lines.

The outputs from registers are stored in memory 322. One possible implementation of memory 322 includes a buffered line array to store the values from registers 306–312. The normalization value represented by equation 4 and equation 7 can be computed in normalization factor computation 323. The value computed in normalization factor computation 323 is supplied to reciprocator 325, where the reciprocal of this value is computed. This reciprocal value is supplied as an input to each of multipliers 314–320. In multipliers 314–320, the reciprocal value is multiplied by the lineweight values received from memory 322. Multiplication by the reciprocal of the value computed in normalization factor computation 323 effectively accomplishes the division by the normalization factor as shown in equation 2 or equation 6. The outputs of multipliers 314–320 are summed in adder 324. The output from adder 324 is used in determining the pulse codes for the actual scan lines.

FIG. 8 shows two of the possible ways in which the output from adder 324 could be used to determine pulse codes for the actual scan lines. To emphasize that there are at least two alternative ways in which to use the output from adder 324, the corresponding portion of FIG. 8 is represented by dashed lines. One way in which the output from adder 324 could be used to determine the actual scan lines is to apply pulse code dither 328. The operations performed in pulse code dither corresponds to the fourth way discussed in paragraph 0031 of adjusting the portion of the pixel exposed. The fourth way discussed in paragraph 0031 includes variable placement of edges within pixels to reduce the occurrence of artifacts. More detail about this technique can be found, in one example, in U.S. Pat. No. 5,729,277, issued to Robert D. Morrison, assigned to Hewlett Packard Company, and incorporated by reference into this specification in its entirety. Another way in which the output from adder 324 could be used to determine the actual scan lines is through the operation of pulse code transformer 326. Pulse code transformer 326 can implement one of the first methods described in paragraphs 0025 through 0030 to adjust the portion of the pixel exposed. More detail about this technique can be found, in one example, in U.S. Pat. No. 5,990,923, issued to Robert D. Morrison, assigned to Hewlett Packard Company, and incorporated by reference into this specification in its entirety.

The embodiment of scaling device 20 disclosed in FIG. 8 corresponds to an implementation in which a linear distribution function (such as a step function) maybe used. However, it should be recognized that the embodiment of scaling device 20 disclosed in FIG. 8 is just one of a variety of possible lineweight implementations that could be used.

Figure 9:
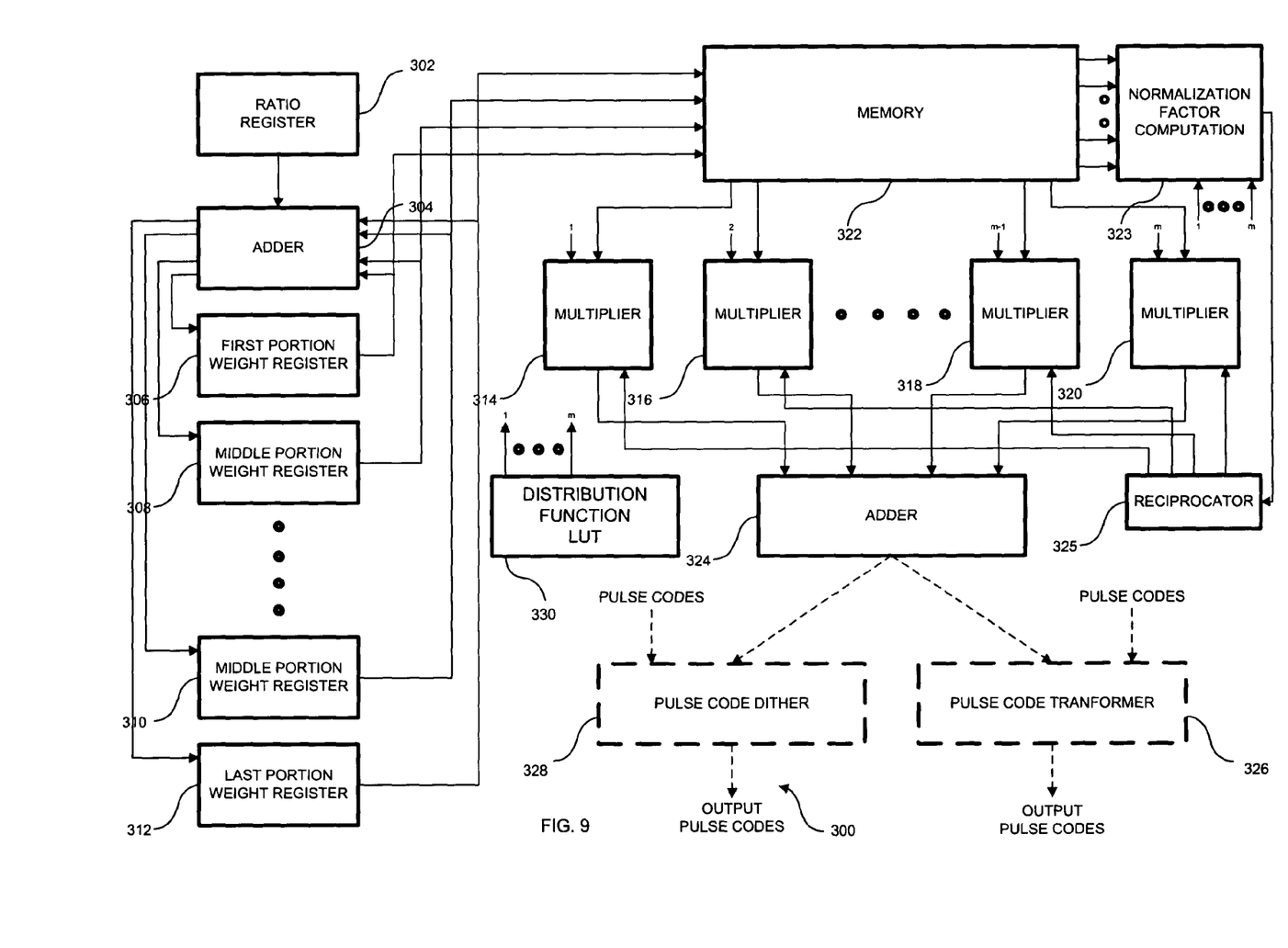

Shown in FIG. 9 is an additional embodiment of scaling device 20. The embodiment of scaling device 20 shown in FIG. 9 corresponds to an implementation in which an arbitrary distribution function may be used. Elements labeled with the same reference numbers as used in FIG. 8 have the same function disclosed in FIG. 8. The functions of those elements will not be repeated in the description of the embodiment of the scaling device disclosed in FIG. 9. Distribution function lookup table 330 shown in FIG. 9 represents separate look up tables each associated with a corresponding one of multipliers 314–320. The outputs (1 through m) are each coupled to an input of one of multipliers 314–320 and normalization factor computation 323. The number of outputs corresponds to the number of lookup tables represented by distribution function lookup table 330 and the number of multipliers 314–320. Distribution function lookup table 330 is used to store values corresponding to the desired distribution function. The values stored in distribution function lookup table 330 are multiplied, in respective ones of multipliers 314–320, by the values received from memory 322 (to form the lineweight values) and multiplied by the reciprocal value computed in reciprocator 325. The outputs from multipliers 314–320 are provided to adder 324. The values stored in distribution function lookup table 330 can be selected to correspond to an arbitrary distribution function such as a gaussian function, a triangle function, or a delta function.

Figure 10:
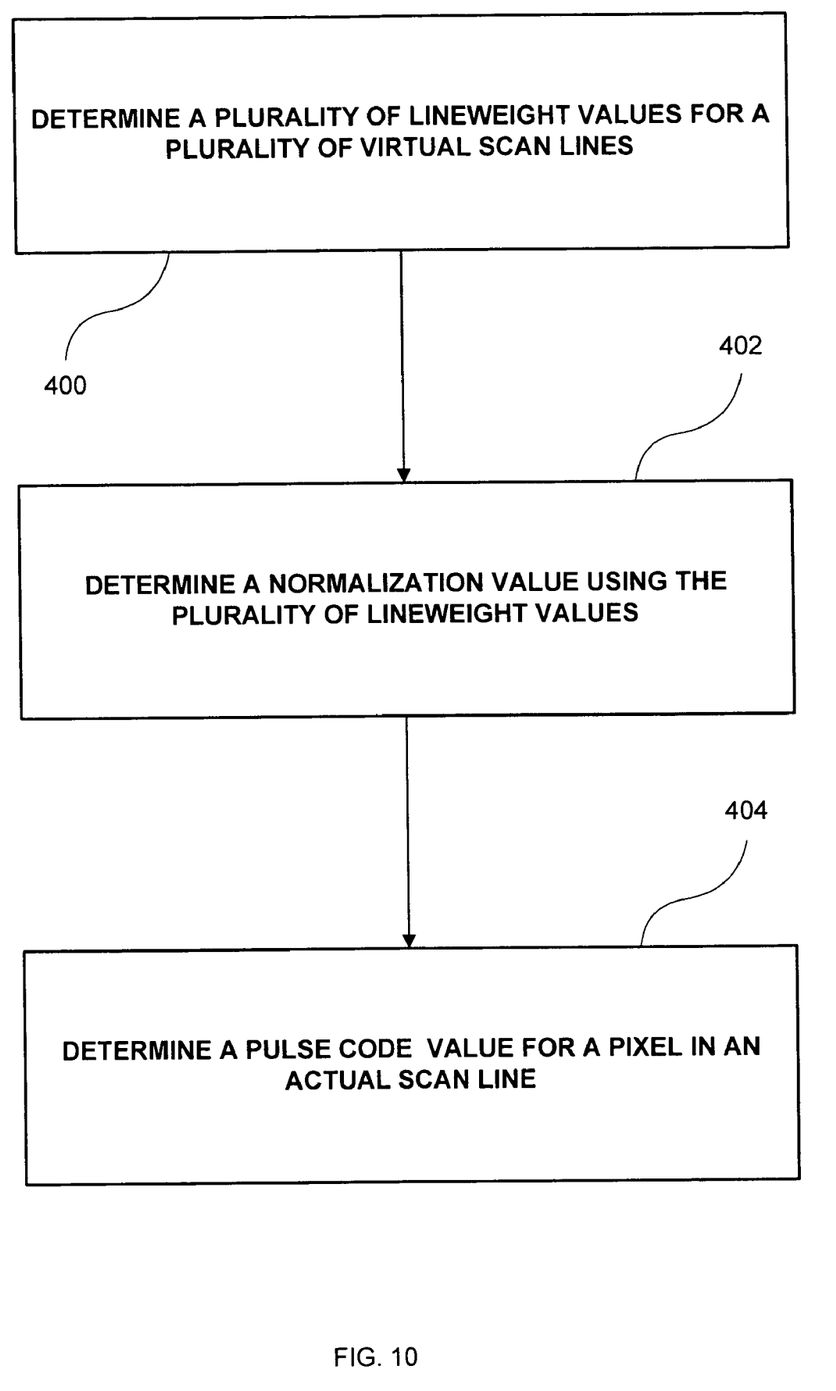

Shown in FIG. 10 is a high level flow diagram of an embodiment of a method for scaling an image. The method could be used to scale an image by operating with an embodiment of scaling device 20 or In step 400, a plurality of lineweight values are determined for a plurality of virtual scan lines. Then step 402, a normalization value is determined using the plurality of lineweight values. Next, in step 404, a pulse code value for a pixel in an actual scan line is determined using the plurality of lineweight values, the normalization value, and pulse code values for pixels in the plurality of virtual scan lines.

Although the embodiment of the method disclosed in FIG. 10 could be implemented, using for example the hardware disclosed in FIG. 8 or FIG. 9, it should be recognized that embodiments of the method could be implemented using a processor executing instructions that are stored on a processor readable medium. "Processor readable medium" can be any media that can contain, store, or maintain programs and data for use by or in connection with the instruction execution system. Processor readable media can comprise any one of many physical media such as, for example, electronic, magnetic, optical, electromagnetic, infrared, or semiconductor media. More specific examples of suitable processor readable media include, but are not limited to, a portable magnetic computer diskette such as floppy diskettes or hard drives, a random access memory (RAM), a read-only memory (ROM), an erasable programmable read-only memory, or a portable compact disc. Processor readable media may also refer to signals that are used to propagate the processor executable instructions over a network or a network system such as the Internet.

While the description has been provided with reference to the foregoing embodiments, those skilled in the art will understand that many variations may be made therein without departing from the spirit and scope defined in the following claims. The description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding, two or more such elements.

What is claimed is:

1. A method for scaling an image, comprising:
    determining a plurality of lineweight values for a plurality of virtual scan lines;
    determining a normalization value using the plurality of lineweight values; and determining a pulse code value for a pixel in an actual scan line by combining pulse code values for pixels in the plurality of virtual scan lines using the plurality of lineweight values and the normalization value.

2. The method as recited in claim 1, wherein:
the pixels in the plurality of virtual scan lines correspond in position to the pixel in the actual scan line.

3. The method as recited in claim 2, wherein:
determining the pulse code value for the pixel in the actual scan line includes using pulse code values from all of the plurality of virtual scan lines for the actual scan line.

4. The method as recited in claim 2, wherein:
determining the pulse code value for the pixel in the actual scan line includes using pulse code values from fewer than the plurality of virtual scan lines.

5. The method as recited in claim 2, wherein:
determining the pulse code value for the pixel includes combining the pulse code values for the pixels in the plurality of virtual scan lines using a spatial OR operation.

6. The method as recited in claim 2, wherein:
determining the pulse code value for the pixel includes forming transformed pulse code values for the pixels in the plurality of virtual scan lines corresponding to fixing edges of corresponding pulses in the pixels of the plurality of virtual scan lines and removing a section of the pulses according to ones of the plurality of lineweight values corresponding to the plurality of virtual scan lines, and combining the transformed pulse code values for the pixels in the plurality of virtual scan lines using a spatial OR operation.

7. The method as recited in claim 2, wherein:
determining the pulse code value for the pixel includes forming transformed pulse code values for the pixels in the plurality of virtual scan lines corresponding to fixing edges of corresponding pulses in the pixels of the plurality of virtual scan lines and uniformly removing a plurality of sections of the pulses according to ones of the plurality of lineweight values corresponding to the plurality of virtual scan lines, and combining the transformed pulse code values using a spatial OR operation.

8. The method as recited in claim 2, wherein:
determining the pulse code value for the pixel includes forming transformed pulse code values for the pixels in the plurality of virtual scan lines corresponding to fixing edges of corresponding pulses in the pixels of the plurality of virtual scan lines and randomly removing a plurality of sections of the pulses according to ones of the plurality of lineweight values corresponding to the plurality of virtual scan lines, and combining the transformed pulse code values using a spatial OR operation.

9. The method as recited in claim 1, wherein:
determining the plurality of lineweight values includes using a value greater than one corresponding to a number of the virtual scan line used for each of the actual scan line.

10. The method as recited in claim 9, wherein:
determining the normalization value includes forming a sum of the plurality of the lineweight values.

11. The method as recited in claim 1, wherein:
determining the plurality of lineweight values includes using a distribution function selected from a group including a step function, a delta function, and a gaussian function.

12. The method as recited in claim 1, wherein:
determining the plurality of lineweight values includes using a value less than one corresponding to a number of the virtual scan line used for each of the actual scan line.

13. The method as recited in claim 12, wherein:
determining the normalization value includes forming a sum of the plurality of the lineweight values.

14. An apparatus, comprising:
a ratio register to store a scaling factor for an image;
an adder coupled to the ratio register;
a plurality of registers coupled to the adder;
a memory coupled to the plurality of registers to store a plurality of values received from the plurality of registers; and
a plurality of multipliers coupled to the memory and configured to compute a plurality of lineweight values by multiplying the plurality of values and a reciprocal of a normalization factor.

15. The apparatus as recited in claim 14, further comprising:
a normalization factor computation module coupled to the memory and configured to determine the normalization factor using the plurality of values.

16. The apparatus as recited in claim 15, further comprising:
a reciprocator coupled the normalization factor computation module and the plurality of multipliers and configured to determine the reciprocal of the normalization factor.

17. The apparatus as recited in claim 16, further comprising:
a second adder, where the adder corresponds to a first adder, coupled to the plurality of multipliers.

18. The apparatus as recited in claim 17, further comprising:
means for determining transformed pulse codes coupled to the second adder.

19. The apparatus as recited in claim 18, wherein:
the means for determining transformed pulse codes includes a configuration to form the transformed pulse code values for pixels in a plurality of virtual scan lines corresponding to fixing edges of corresponding pulses in the pixels of the plurality of virtual scan lines and removing a section of the pulses according to ones of the plurality of lineweight values corresponding to the plurality of virtual scan lines, and combining the transformed pulse code values for the pixels in the plurality of virtual scan lines using a spatial OR operation.

20. The method as recited in claim 18, wherein:
the means for determining transformed pulse codes includes a configuration to form the transformed pulse code values for pixels in a plurality of virtual scan lines corresponding to fixing edges of corresponding pulses in the pixels of the plurality of virtual scan lines and uniformly removing a plurality of sections of the pulses according to ones of the plurality of lineweight values corresponding to the plurality of virtual scan lines, and combining the transformed pulse code values using a spatial OR operation.

21. The method as recited in claim 18, wherein:
the means for determining transformed pulse codes includes a configuration to form the transformed pulse code values for pixels in a plurality of virtual scan lines corresponding to fixing edges of corresponding pulses in the pixels of the plurality of virtual scan lines and randomly removing a plurality of sections of the pulses according to ones of the plurality of lineweight values corresponding to the plurality of virtual scan lines, and combining the transformed pulse code values using a spatial OR operation.

22. The apparatus as recited in claim 15, further comprising:
a plurality of lookup tables, coupled to the plurality of multipliers and the normalization factor computation module, to hold distribution function values used to compute the plurality of lineweight values and the normalization factor.

23. The apparatus as recited in claim 22, wherein:
the distribution function is selected from a group consisting of a gaussian distribution function, a linear distribution function, a delta distribution function.

24. An apparatus, comprising:
means for determining lineweight values using a distribution function and a value of virtual scan lines used for each actual scan line;
means for determining a normalization factor using the lineweight values; and
means for determining pulse code values for actual scan lines by combining pulse code values for pixels in a plurality of the virtual scan lines using the lineweight values and the normalization factor.

25. A processor readable medium, comprising:
a storage medium; and processor executable instructions stored on the storage medium, with the processor executable instructions configured to determine a plurality of lineweight values for a plurality of virtual scan lines, to determine a normalization value using the plurality of lineweight values, and to determine a pulse code value for a pixel in an actual scan line by combining pulse code values for pixels in the plurality of virtual scan lines using the plurality of lineweight values and the normalization value.

26. The processor readable medium as recited in claim 25, wherein:
the pixels in the plurality of virtual scan lines correspond in position to the pixel in the actual scan line.

27. The processor readable medium as recited in claim 26, wherein:
the processor executable instructions include a configuration to determine the pulse code value for the pixel in the actual scan line using pulse code values from all of the plurality of virtual scan lines for the actual scan line.

28. The method as recited in claim 26, wherein:
the processor executable instructions include a configuration to determine the pulse code value for the pixel in the actual scan line using pulse code values from fewer than the plurality of virtual scan lines.

29. The method as recited in claim 26, wherein:
the processor executable instructions include a configuration to determine the normalization value by forming a sum of the plurality of the lineweight values.

30. The method as recited in claim 25, wherein:
the processor executable instructions include a configuration to determine the plurality of lineweight values using a distribution function selected from a group including a step function, a delta function, and a gaussian function.

31. An image forming system, comprising:
a photoconductor;
a photoconductor exposure system to form a latent electrostatic image on the photoconductor according to a signal received from a drive circuit configured to generate the signal using binary data;
a pulse width modulator configured to generate the binary data using transformed pulse code values; and
a scaling device configured to generate the transformed pulse code values by combining pulse code values for pixels in a plurality of virtual scan lines using a plurality of lineweight values determined for a plurality of virtual scan lines.

32. The image forming system as recited in claim 31, further comprising:
a pulse code generator to generate the pulse codes using pixel data.

33. The image forming system as recited in claim 32, further comprising:
a pixel data generator to generate the pixel data using image data.

34. The image forming system as recited in claim 31, wherein:
the scaling device includes a configuration to determine a normalization value, using the plurality of lineweight values, with the normalization value used for determining the transformed pulse code values.

35. The image forming system as recited in claim 31, wherein:
the scaling device performs a compression of an image by using more than one of the plurality virtual scan lines to form an actual scan line.

36. The image forming system as recited in claim 31, the scaling device performs an expansion of an image by using one of the plurality of the virtual scan lines to form more than one actual scan lines.

* * * * *